Oct. 24, 1950  B. L. JENKS, JR., ET AL  2,527,446
TURBINE APPARATUS

Filed Sept. 17, 1948  3 Sheets-Sheet 1

WITNESSES:
V. W. Novak
A. Chawaya

INVENTORS:—
BARTON L. JENKS JR.
GEORGE W. PENTHENY
BY
ATTORNEY

Oct. 24, 1950     B. L. JENKS, JR., ET AL     2,527,446
TURBINE APPARATUS

Filed Sept. 17, 1948     3 Sheets—Sheet 2

INVENTORS:—
BARTON L. JENKS JR.
GEORGE W. PENTHENY
ATTORNEY

Oct. 24, 1950     B. L. JENKS, JR., ET AL     2,527,446
TURBINE APPARATUS

Filed Sept. 17, 1948     3 Sheets-Sheet 3

INVENTORS:—
BARTON L. JENKS JR.
GEORGE W. PENTHENY
BY    *a. B. Ramig*
ATTORNEY

Patented Oct. 24, 1950

2,527,446

UNITED STATES PATENT OFFICE 2,527,446

TURBINE APPARATUS

Barton L. Jenks, Jr., Swarthmore, and George W. Pentheny, East Lansdowne, Pa., assignors to Westinghouse Electric Corporation, East Pittsburgh, Pa., a corporation of Pennsylvania Application September 17, 1948, Serial No. 49,752

3 Claims. (Cl. 253—78)

The invention relates to high-temperature apparatus wherein a tubular member extends through an opening formed in a wall element and is connected to the latter by a tubular collar welded at one of its ends to the wall element and at its other end to the tubular member and wherein the wall element and the tubular member are made of metallic materials having different coefficients of thermal expansion, and it has for an object to provide the tubular collar of bi-metallic construction comprising a pair of sections welded together with the sections which are respectively welded to the wall element and to the tubular member made of materials which are respectively the same as the latter, whereby provision is made for expansion and contraction of the sections with the wall element and with the tubular member without the introduction of high stresses in the welded connections thereof incident to heating and cooling and the collar is thereby made flexible to confine the differential contraction and expansion to the sections thereof, in consequence of which stresses in the collar and its welded connections to the wall element and to the tubular member are reduced.

In turbines supplied with high-temperature motive fluid, the motive fluid is usually initially furnished to nozzle boxes of an impulse stage within the cylinder. Expansion of the motive fluid in the impulse stage is, of course, accompanied by drop in temperature and pressure. Therefore, the supply piping and nozzle boxes are subject to the maximum temperatures and the cylinder is exposed to somewhat lower temperatures, in consequence of which, the piping and nozzle boxes are necessarily made of material having high endurance to heating. Each nozzle box and its inlet tubular neck may be made of stainless steel, for example, "18—8" stainless steel, whereas the cylinder may be made of chrome molybdenum steel. As the nozzle box tubular necks pass through the cylinder wall, it is necessary to connect and seal them in some way with respect to the latter. This has been done by providing a tubular collar encompasing each neck in its opening in the cylinder wall and having one end welded to the nozzle box construction and the other end welded to the cylinder, as more particularly disclosed and claimed in the application of Pentheny, Serial No. 751,801, filed June 2, 1947. As stainless steel has a higher coefficient of thermal expansion than chrome molybdenum steel, differential expansion and contraction necessarily resulted in high stresses in the welded connections of the collar with the nozzle box construction and the cylinder, particularly in the welded connection of the collar with the cylinder. Not only is each welded connection subject to tangential or hoop stress due to differential expansion and contraction of the connected parts, but differential expansion and contraction of the cylinder and the nozzle box construction imposes bending stresses on the welded connections, particularly on the welded connection between the collar and the cylinder. In accordance with our invention, these stresses are greatly reduced by the provision of a bi-metallic collar consisting of a pair of sections welded together circumferentially with the sections made of materials which are respectively the same as those of the parts to which they are welded. As the stainless steel nozzle box construction has a tubular stainless steel section welded thereto and the chrome molybdenum steel cylinder has a chrome molybdenum steel section connected thereto, the tubular sections expand and contract with the parts to which they are welded, and, as each tubular section is of suitable length, the inherent flexibility thereby provided practically eliminates bending stresses in the end and intermediate welded connections and greatly reduces the tangential stress, that is, the tangential stress of the middle connection is relatively much smaller than the maximum tangential stress where a single-piece collar is used. While the invention has advantageously solved a problem arising in high-temperature turbine practice, it is applicable in any situation where different metallic materials are connected by a tubular member or collar circumferentially welded thereto.

A more particular object of the invention is to provide a turbine wherein the nozzle boxes and the cylinder are made of different metallic materials and each nozzle box has a tubular neck extending through an opening in the cylinder wall and to connect the tubular neck and the cylinder by means of a bi-metallic tubular collar, one end of the collar being welded to the nozzle box construction and the other end thereof being welded to the cylinder, the tubular collar comprising a pair of tubular sections welded together and being made of materials which are respectively the same as the members of the parts to which they are welded.

The foregoing and other objects are effected by the invention as will be apparent from the following description and claims taken in connection with the accompanying drawings, forming a part of this application, in which:

Figure 1:
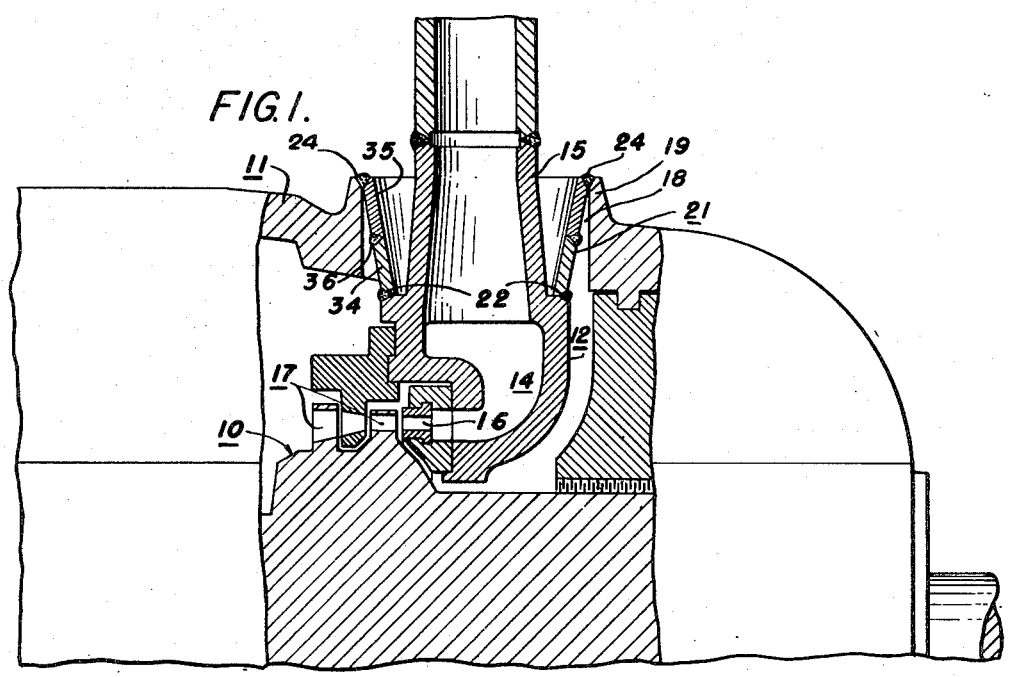
Figs. 1 and 2 are detail sectional views of turbines having the present invention applied thereto.

In Fig. 1, there is shown fragmentarily in section a portion of a turbine including the rotor 10 and the cylinder 11. Superheated steam or high-temperature elastic fluid is supplied to nozzle box constructions, at 12, each including a nozzle box 14 and a tubular neck 15 for admitting high-temperature elastic fluid thereinto. Each nozzle box is housed within the cylinder 11 and is provided with nozzles 16 for supplying elastic fluid to impulse blading 17 carried by the rotor and cylinder.

As elastic fluid undergoes drop in temperature and pressure incident to expansion in the nozzles, there necessarily naturally exists the situation of the nozzle boxes and their supply piping being subject to maximum temperatures and the cylinder to a somewhat lower temperature.

To provide endurance for high temperatures, the nozzle box constructions are made of suitable heat-resistant material, such as stainless steel, for example, 18—8 stainless steel, and the cylinder is made of chrome molybdenum steel.

The nozzle box tubular necks extend through openings 18 in the cylinder wall and are bounded by tubular extensions 19 of the latter. A tubular collar 21 encompasses each neck in its cylinder wall opening, the collar being frusto-conical with its inner or smaller end welded, at 22, to the nozzle box construction and its outer or larger end welded, at 24, to the cylinder tubular extension 19, the latter extensions facilitating welding and annealing in that they may be rapidly heated and cooled.

Figure 2:
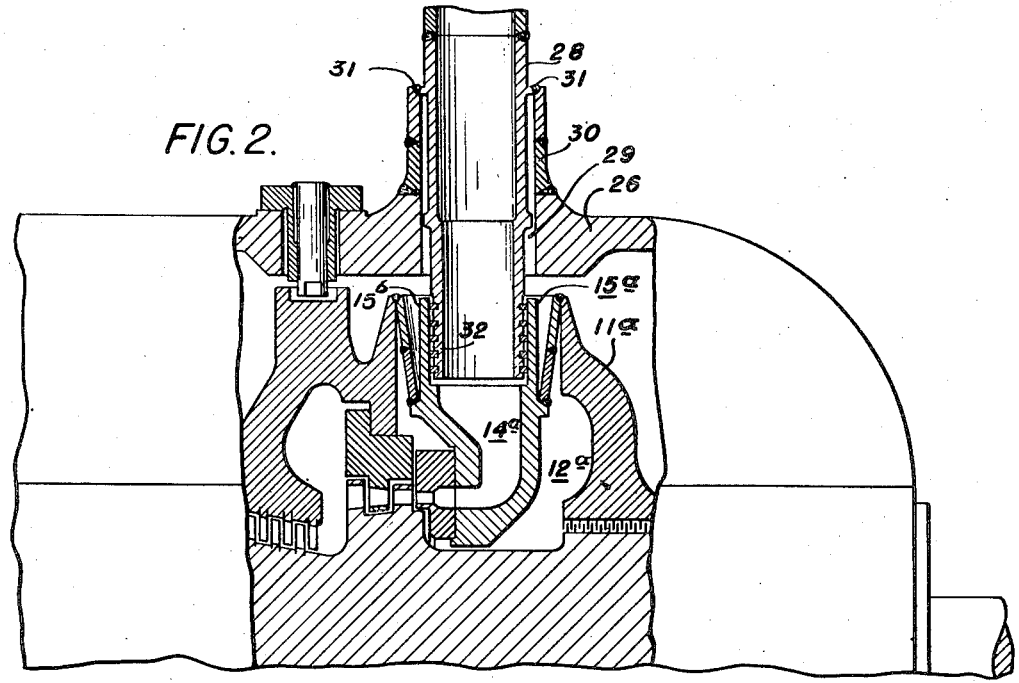

In Fig. 2, there is shown a turbine of the double-walled type, the cylinder proper including an outer cylinder wall 26, supporting interiorly thereof the inner wall or cylinder 11a housing nozzle boxes 14a of the nozzle box construction, at 12a, the nozzle box constructions having tubular necks 15a for admitting high-temperature elastic fluid into the nozzle boxes.

The space between the inner and outer cylinders is furnished with elastic fluid at intermediate pressure and temperature, whereby the outer cylinder is subject only to elastic fluid of moderate temperatures and pressures.

The piping for supplying high-temperature elastic fluid to the nozzle box constructions includes pipe sections 28 extending through openings 29 formed in the outer cylinder, the latter preferably having tubular extensions 30 to facilitate the formation of circumferential welds 31 connecting the pipe sections to the outer cylinder. The inner ends 32 of the pipe sections form telescopic joints with respect to outer ends 15b of the tubular necks 15a.

Figure 3:
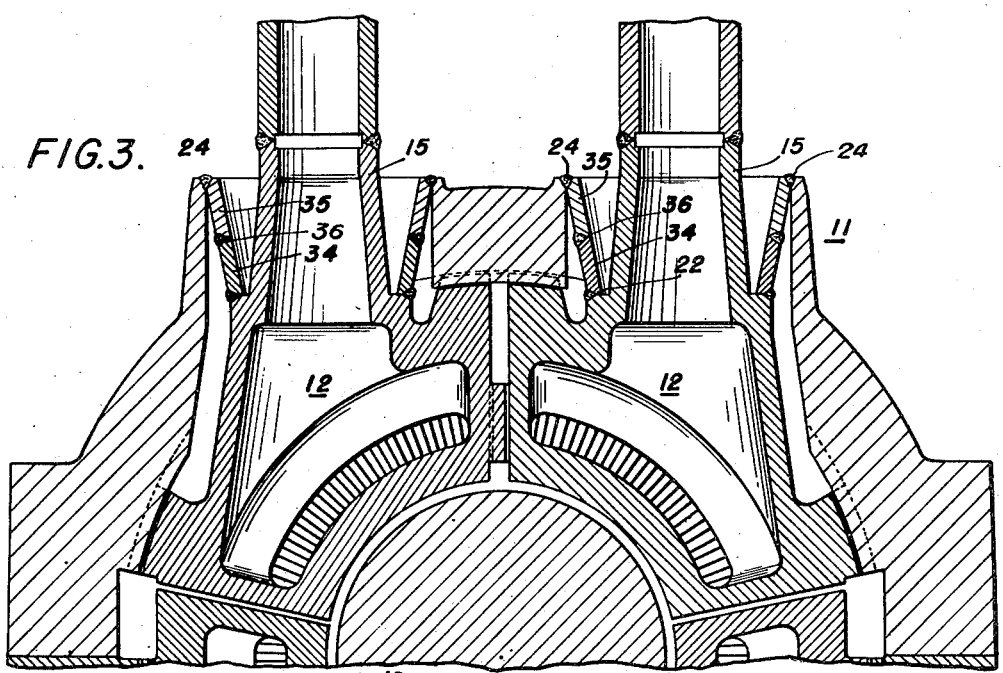
Figs. 3 and 4 are fragmentary transverse sectional views of turbines corresponding to Figs. 1 and 2.
Figure 4:
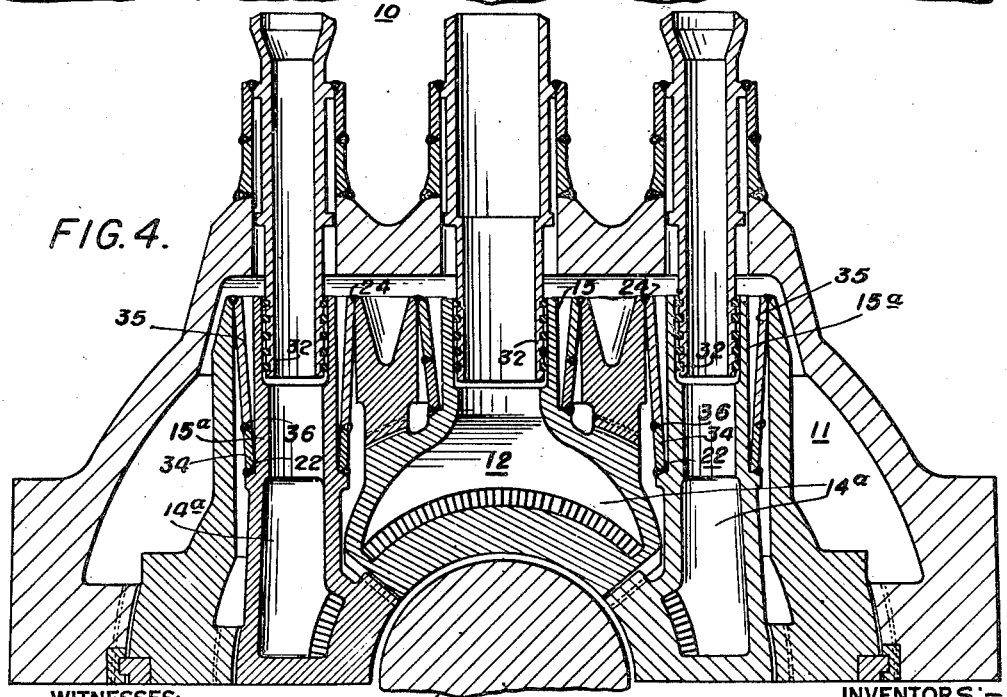

As diagrammatically indicated in Figs. 3 and 4, each turbine preferably has a circumferential series of nozzle boxes and each of the latter has a tubular neck connected to the supply piping.

As each nozzle box construction is formed of stainless steel while the cylinder is made of chrome molybdenum steel, the former has a higher coefficient of thermal expansion. Therefore, where a single-piece tubular collar is circumferentially welded at its ends to the nozzle box construction and to the cylinder, not only will each weld be stressed due to differential expansion and contraction of the tubular collar with respect to the nozzle box construction as well as with respect to the cylinder, but, as the ends of the collar are attached to the nozzle box construction and to the cylinder, the circumferential end welds are subject to extremely high tangential and bending stresses.

Figure 5:
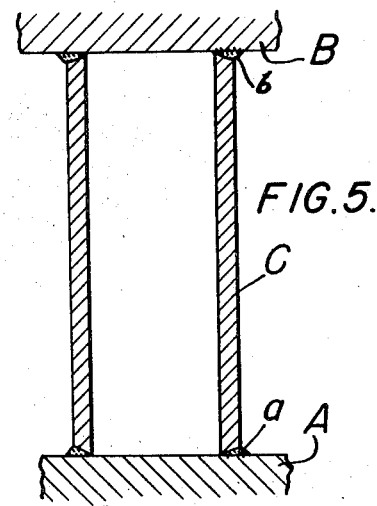
Figs. 5 and 6 are diagrammatic views illustrative of principles of the invention.

In accordance with the present invention, the two rigid members, that is, the nozzle box construction and the cylinder, instead of being joined by a single-piece collar, as heretofore and as diagrammatically indicated in Fig. 5, are joined by a bi-metallic collar consisting of inner and outer sections 34 and 35 having their adjacent ends welded together circumferentially, at 36. The inner section 34 welded to the nozzle box construction is made of the same material as the latter, that is, they are made of stainless steel. Likewise, the outer tubular sections 35 are made of the same material, chrome molybdenum steel, as the cylinder. Therefore, the inner and outer tubular sections 34 and 35 expand and contract with the members to which they are attached, thereby greatly minimizing tangential stresses in the circumferentially-welded connections to the nozzle box constructions and to the cylinder; and, as the differential expansion and contraction is confined to the bi-metallic tubular collar, the inherent flexibility thereof accommodates for deformation thereof and otherwise manifested as severe bending stress in the welded connections while the sections may expand and contract with the nozzle box constructions and with the cylinder with the result that bending stresses are greatly reduced.

Figure 6:
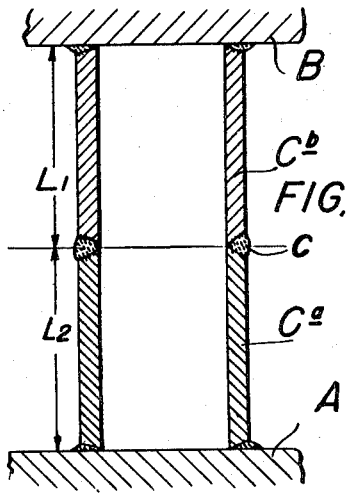

The problem of meeting acute stresses will be clearer from a consideration of Figs. 5 and 6. In Fig. 5 there are shown diagrammatically two bodies of different metals A and B having different coefficients of thermal expansion and tubular collar C having its ends welded thereto at "a" and at "b." Due to direct connection of different materials by the circumferential welds "a" or "b," and subject to high temperatures, such as in a welding or annealing process, as the connected parts cool, the difference in their thermal contractions cause extremely high stresses. Likewise, differential expansion incident to heating produces a state of high stress in the welds connecting different materials. In addition to tangential or hoop stress on this account, as the ends of the collar are attached to the bodies A and B, differential expansion and contraction of the latter will result in imposition of bending stresses in the welds.

If, instead of a single-piece tubular collar as in Fig. 5, there is provided, as shown in Fig. 6, a bi-metallic collar comprising tubular sections $C_a$ and $C_b$ welded together at "c" and made of the same metallic materials as the bodies A and B to which they are respectively welded, the stress problem may be greatly alleviated for the reason that the tubular sections being made of the same material as the members to which they are respectively attached, expand and contract with the latter; and, as the differential expansion is thereby confined to the sections of the tubular collar, its inherent flexibility accommodates therefor, thereby avoiding bending stresses set up at the welds $a$ and $b$ due to differential expansion of A and B.

It is essential that the sections $C_a$ and $C_b$ be of suitable lengths $L_1$ and $L_2$. If the sections are too short, not only will the middle weld "$c$" be severely stressed, but the stiffness results in high bending stresses in the welds "$a$" and "$b$". Each section should be sufficiently long to provide flexibility adequate to reduce the stresses to relatively low or desired values.

To obtain the desired flexibility, the lengths $L_1$ and $L_2$ of the collar sections must have at least a certain minimum value. The minimum length for a cylinder or cone bears a definite relation to the radius and wall thickness so that practical limits may be set up. In this connection, the following equation may be used:

$$K = \frac{\sqrt[4]{3(1-u^2)}}{\sqrt{Rt}} L$$

where "$u$" is Poisson's ratio, "$R$" is the average collar radius, "$t$" is the wall thickness, and "$L$" is either $L_1$ or $L_2$. Values of K between 2.4 and 10 would give a practical range of application.

Figure 7:
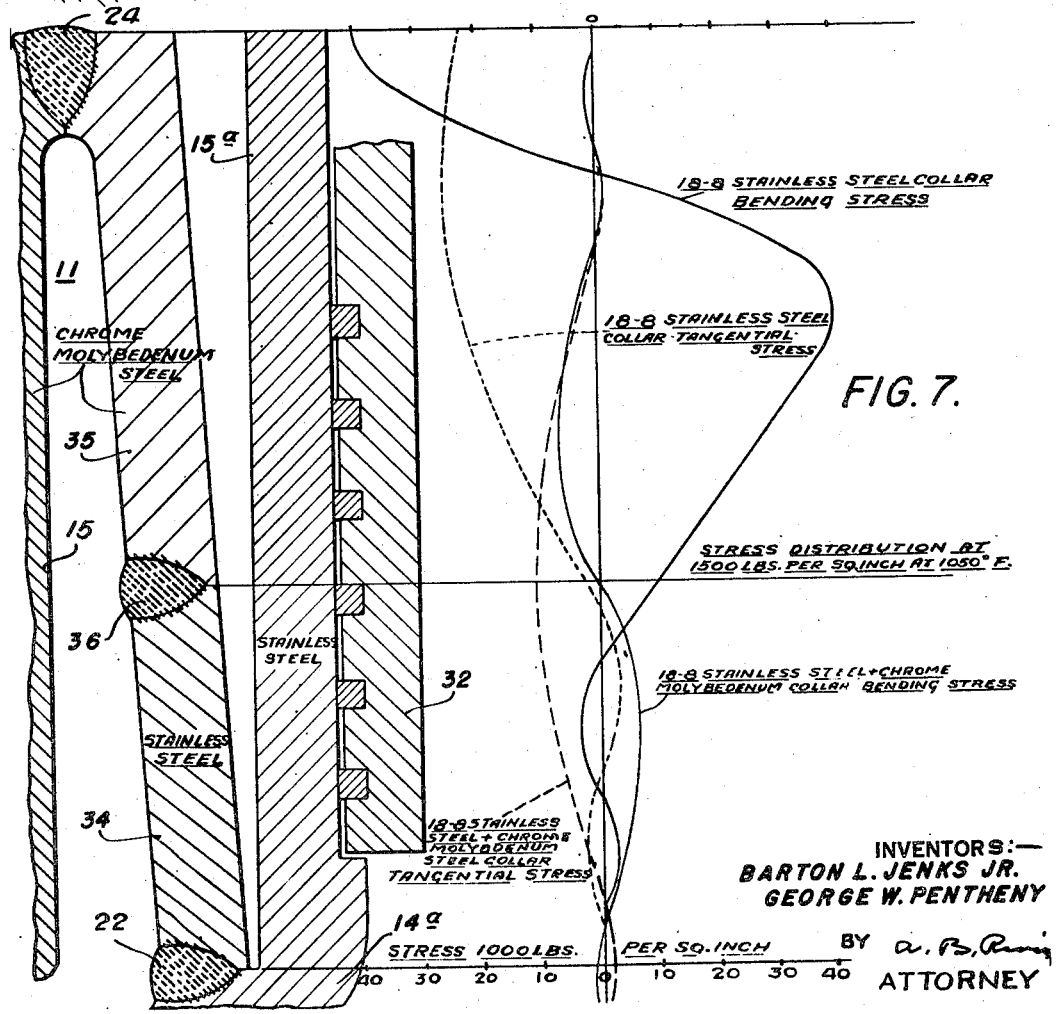
Fig. 7 is a graph of stress curves applicable to single-piece and bi-metallic collars.

The stress curves of Fig. 7 show the advantage for the bi-metallic tubular collar as contrasted to a stainless steel or 18—8 collar. From these curves, it will be noted that both the tangential and bending stresses reach rather high values, particularly for the welded connection between the outer end of the collar and the cylinder, whereas these stresses are practically non-existent at this location for the bi-metallic construction. Furthermore, with tubular sections of suitable length, the connecting weld may be located for low values of tangential and bending stress, for example, for zero bending stress and a tangential stress which is less than the tangential stress of the weld connection between the outer end of a single-piece stainless steel tubular collar and the cylinder.

While we have shown my invention in several forms, it will be obvious to those skilled in the art that it is not so limited, but is susceptible of various changes and modifications without departing from the spirit thereof.

What we claim is:

1. In a turbine, a cylinder, a rotor, blading carried by the cylinder and by the rotor, a nozzle box construction including a nozzle box and a tubular neck for admitting steam thereinto, said nozzle box being housed within the cylinder and including nozzles for supplying steam therefrom to the blading, said cylinder having an opening through which the tubular neck extends, said cylinder and the nozzle box construction being made of metallic materials having different coefficients of thermal expansion, a tubular collar encompassing the tubular neck in said opening and having its inner end circumferentially welded to the nozzle box construction and its outer end circumferentially welded to the cylinder, said collar comprising a pair of tubular sections having their adjacent ends welded together circumferentially and being made of materials which are the same as those of the nozzle box construction and the cylinder to which they are respectively welded.

2. In a turbine, a cylinder made of chrome molybdenum steel, a rotor, blading carried by the cylinder and by the rotor, a circumferential series of stainless steel nozzle box constructions encompassing the rotor and each including a nozzle box and a tubular neck for admitting steam thereinto, each nozzle box being housed within the cylinder and including nozzles for supplying steam therefrom to the blading, said cylinder having openings bounded by tubular extensions and through which the tubular necks extend, frusto-conical tubular collars encompassing the tubular necks in said openings and having their smaller and inner ends circumferentially welded to the nozzle box constructions and having their larger and outer ends circumferentially welded to the outer ends of said tubular extensions, each of said collars including inner and outer tubular sections welded together circumferentially, said inner sections being made of stainless steel and welded to the stainless steel nozzle box constructions and said outer tubular sections being made of chrome molybdenum steel and being welded to the chrome molybdenum cylinder tubular extensions.

3. In a turbine, a cylinder, a rotor, blading carried by the cylinder and by the rotor, a nozzle box construction including a nozzle box and a tubular neck for admitting steam thereinto, said nozzle box being housed within the cylinder and including nozzles for supplying steam therefrom to the blading, said cylinder having an opening through which the tubular neck extends, said cylinder and the nozzle box construction being made of metallic materials having different coefficients of thermal expansion, a frusto-conical tubular collar encompassing the tubular neck in said opening and having its inner end circumferentially welded to the nozzle box construction and its outer end circumferentially welded to the cylinder, said collar comprising a pair of tubular sections having their adjacent ends welded together circumferentially and being made of materials which are the same as those of the nozzle box construction and the cylinder to which they are respectively welded.

BARTON L. JENKS, Jr.
GEORGE W. PENTHENY.

REFERENCES CITED

The following references are of record in the file of this patent:

UNITED STATES PATENTS

| Number | Name | Date |
|---|---|---|
| 2,058,479 | Lysholm | Oct. 27, 1936 |
| 2,112,738 | Doran | Mar. 29, 1938 |
| 2,161,617 | Doran | June 6, 1939 |